No. 679,507. Patented July 30, 1901.
G. W. LA VOO.
PROCESS OF MAKING SMALL PIPE COUPLINGS.
(Application filed June 23, 1900.)
(No Model.)
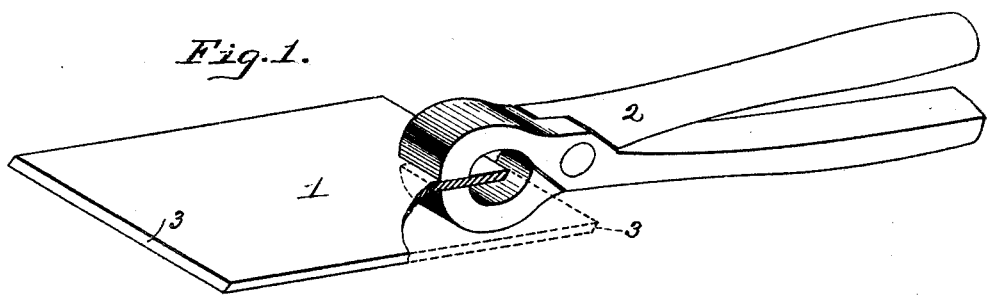
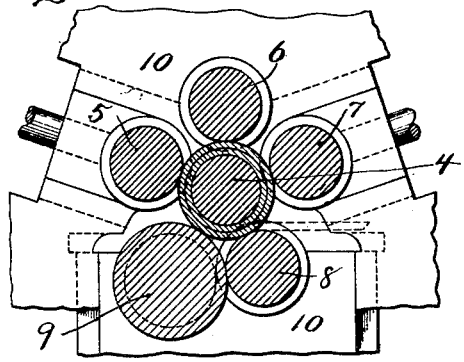
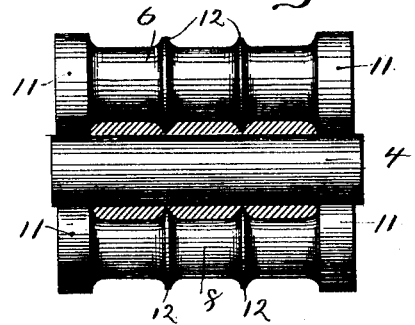
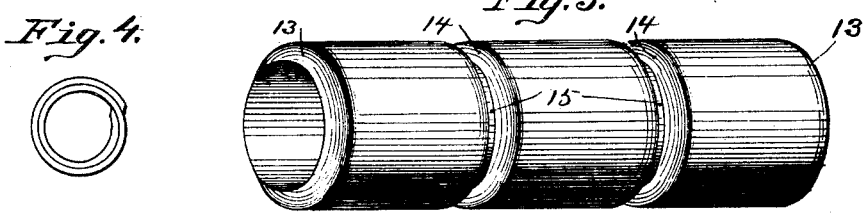
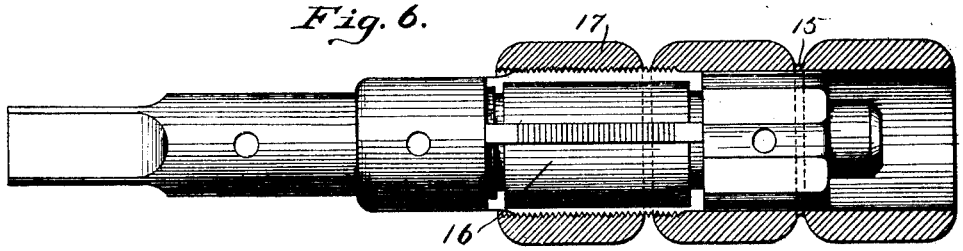

UNITED STATES PATENT OFFICE.

GEORGE W. LA VOO, OF PITTSBURG, PENNSYLVANIA, ASSIGNOR TO THE NATIONAL TUBE COMPANY, OF NEW YORK, N. Y.

PROCESS OF MAKING SMALL PIPE-COUPLINGS.

SPECIFICATION forming part of Letters Patent No. 679,507, dated July 30, 1901.

Application filed June 23, 1900. Serial No. 21,308. (No model.)

*To all whom it may concern:*

Be it known that I, GEORGE W. LA VOO, a resident of Pittsburg, in the county of Allegheny and State of Pennsylvania, have invented a new and useful Improvement in Processes of Making Small Pipe-Couplings; and I do hereby declare the following to be a full, clear, and exact description thereof.

My invention relates to the manufacture of pipe-couplings, thread-protectors, &c., and has for its object a method of effectively coiling and welding articles of this kind of small size.

In the application of David Heggie, Serial No. 733,595, filed October 14, 1899, is described and claimed a method of forming rings or like articles, consisting in cutting a bar of width corresponding to the length of two or more of such rings into blanks of suitable length, heating the blanks, and at one operation welding the same into tubular form and shaping and finishing several rings from each blank, the rings being either separated in the welding operation or left connected together, so that they can be separated by the threading of the inner faces thereof, such as in pipe-couplings or thread-protectors. In the preferred manner of carrying out such method the blank is coiled and welded upon a suitable mandrel inclosed by a group of shaping and welding rolls; but in forming couplings and like articles of small size by this method it was found that the blank was not of sufficient length to project into the bite of the rolls and mandrel when held in the tongs, for the reason that the latter abutted against the faces of the entering rolls, preventing the insertion of the blank a sufficient distance into the rolls to secure the necessary biting action of the rolls and mandrel thereon, or if the rolls did engage the blank they were liable to draw the tongs against the rolls before the workman could free them, which was liable to cause accidents to the machinery or workman. In attempting to work with blanks of a length to form but one coil it was found necessary for the tongs to grasp the blank at the end thereof, so that even if the blank were grasped by the rolls the blank was liable to become sufficiently chilled at the points where the tongs engaged it to prevent proper welding between the meeting edges.

It is the object of my invention to overcome these defects in the coiling and welding of couplings and like articles of small size.

To this end it consists, generally stated, in forming the blank of which the coupling is to be formed of such length and thickness that two coils thereof are necessary in order to form the ring with walls of the required thickness, thereby providing a blank of sufficient length that the tongs may grasp it some distance back of its end and yet leave sufficient length projecting beyond the tongs that when presented to the rolls the blank will be grasped thereby.

To enable others skilled in the art to make and use my invention, I will describe the same more fully, referring to the accompanying drawings, in which—

Figure 1 is a perspective view of a plate or bar suitable for forming two or more couplings or like articles, showing how the same is grasped by the tongs. Fig. 2 is a cross-section of a set of welding-rolls suitable for welding and shaping the blanks. Fig. 3 is a longitudinal section thereof. Fig. 4 is an end view illustrating the manner in which the blank is coiled. Fig. 5 is a perspective view of the series of finished welded couplings connected by thin webs, and Fig. 6 is a longitudinal section illustrating the separation of the couplings in the threading thereof.

The plate or bar 1 is of a width corresponding to the length of two or more pipe-couplings or thread-protectors and of suitable length for coiling to form such couplings, the ends of the plate or bar being preferably scarfed, as at 3, to provide for a suitable finish, as the ends slightly overlap, as shown in Fig. 4. The plate or bar thus formed is raised to a welding heat and introduced by means of tongs 2, which grasp the plate some distance beyond the end thereof, as shown in Fig. 1, into the pass of the set of welding-rolls. (Illustrated in Figs. 2 and 3.) The rolls employed fit around a mandrel 4, corresponding to the internal diameter of the coupling, there being three upper rolls 5, 6, and 7 and two lower rolls 8 and 9, the latter being larger than any of the others to properly feed and guide the blank. The upper and lower rolls are vertically adjustable with reference to each other, so that they may be separated after the formation of the blank to permit its withdrawal, the rolls being mounted in suitable housings 10, which provide for such separation. The specific form of rolls, however, forms no part of my invention, as they are shown and claimed in an application filed by George W. La Voo and Thomas J. Bray, October 31, 1899, Serial No. 735,362.

As shown in the drawings, each roll has formed thereon the end collars 11, and between the same and intermediate of their working faces and forming a part thereof are the projecting rings 12, one or more, according to the number of couplings or rings to be formed at a single operation. In the specific roll illustrated three working faces are provided; but it is obvious that two or any greater number may be provided instead. The inner faces of the collars 11 and the side faces of the projecting rings 12 are curved or inclined according to the desired form to be given the end of the coupling, the rings 12 being preferably brought to rather a thin edge, so that they easily cut into the body of metal, recessing it at such point, so as to separate the blanks and shape the end faces of the couplings—for example, the end faces 13 at the ends of the blank and the like faces 14 intermediate the ends—according to the number of couplings to be produced. The projecting rings 12 may be of such height as to either cut entirely through the plate or bar in the rolling operation, contacting as the blank is finished with the mandrel 4, or to leave a thin web 15 between the couplings as they are welded, this thin web binding the series of couplings together. It is preferred to follow the latter course, because such thin webs hold the series of couplings together, and they can be fed in this form to the threading-tool, as shown in Fig. 6, requiring only the single feeding operation for the series of couplings, the threading-tool 16 forming the inner threaded faces of the couplings and at the same time cutting through the web 15 and separating the blank into the several couplings 17. In this threading operation the ordinary threading-tap may be employed, and I have only illustrated the same diagrammatically to show this step of the operation.

Fig. 4 illustrates the manner in which the blank is coiled in order to form a coupling having walls of the desired thickness, and, as there illustrated, the blank is formed into two coils or layers with the ends slightly overlapping.

In the operation of coiling and welding the couplings the heated blank is fed between the rolls and mandrel, as stated, and is simultaneously coiled, welded, and shaped, the ribs or projections 12 on the rolls cutting into the metal and either severing both of the layers or only the outer one, according as it is desired to entirely separate the finished couplings or leave them connected by the web 15, and in this cutting into or through the metal the several layers are pressed firmly together and the edges thereof are pressed and crushed in such a manner as to firmly weld them together and secure a proper finish for the end of the couplings, the line of union of the two or more layers of which the coupling is composed being largely obliterated.

What I claim as my invention, and desire to secure by Letters Patent, is—

1. The method of forming small couplings or similar articles in cluster-roll welding consisting in forming a plate or bar of such length and thickness that two coils are necessary to form a coupling having walls of the desired thickness, raising said plate or bar to a welding heat, feeding the double-length plate to a cluster of rolls surrounding a mandrel, and in one operation coiling the same into tubular form, welding the layers together, and shaping the body of the coupling.

2. The method of forming small couplings or similar articles, consisting in forming a plate or bar of width corresponding to two or more couplings, and of length and thickness such that two coils are necessary to form a coupling having walls of the desired thickness, raising said plate or bar to a welding heat, and in one operation coiling the same into tubular form, welding the layers together and cutting through one or more layers, thereby shaping a number of couplings from a single blank.

3. The method of forming small couplings or similar articles, consisting in forming a plate or bar of width corresponding to two or more rings and of length and thickness such that two coils are necessary to form a coupling having walls of the desired thickness, raising said plate or bar to a welding heat, and in one operation coiling the same into tubular form, welding the layers together and cutting through the outermost layer, thereby shaping a number of couplings from a single blank and forming thin web connections between them.

4. The method of forming small couplings or similar articles, consisting in forming a plate or bar of width corresponding to two or more couplings, and of length and thickness such that two or more coils are necessary to form a coupling having walls of the desired thickness, raising said plate or bar to a welding heat and in one operation coiling the same into tubular form, welding the layers together and cutting through the outermost layer, thereby shaping a number of couplings from a single blank and forming thin web connections between the same, and subsequently threading the blanks so produced, thereby cutting away the web portions and separating the several couplings.

5. The method of forming small couplings or similar articles consisting in forming a plate or bar of such length and thickness that two coils are necessary to form a coupling having walls of the desired thickness, raising such plate or bar to a welding heat, so grasping the heated blank as to preserve the welding heat at its ends, feeding the same to the rolls, and in one operation coiling the same into tubular form, welding the layers together and shaping the body of the coupling.

In testimony whereof I, the said GEORGE W. LA VOO, have hereunto set my hand.

GEORGE W. LA VOO.

Witnesses:
JAMES I. KAY,
ROBERT C. TOTTEN.